(12) United States Patent
Kang et al.

(10) Patent No.: US 12,579,607 B2
(45) Date of Patent: Mar. 17, 2026

(54) DEMOSAICING METHOD AND APPARATUS FOR MOIRE REDUCTION

(71) Applicant: SAMSUNG ELECTRONICS CO., LTD., Suwon-si (KR)

(72) Inventors: Byong Min Kang, Suwon-si (KR); Dong Kyung Nam, Suwon-si (KR); Juyong Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 393 days.

(21) Appl. No.: 18/144,652

(22) Filed: May 8, 2023

(65) Prior Publication Data

US 2024/0185382 A1 Jun. 6, 2024

(30) Foreign Application Priority Data

Dec. 1, 2022 (KR) ........................ 10-2022-0165748

(51) Int. Cl.
*G06T 3/4015* (2024.01)
*G06T 5/00* (2006.01)
*G06T 7/00* (2017.01)

(52) U.S. Cl.
CPC .............. *G06T 3/4015* (2013.01); *G06T 5/00* (2013.01); *G06T 7/0002* (2013.01); *G06T 2207/10024* (2013.01); *G06T 2207/30168* (2013.01)

(58) Field of Classification Search
CPC ....... G06T 3/4015; G06T 5/00; G06T 7/0002; G06T 2207/10024; G06T 2207/30168; G06T 3/4007; H04N 5/21
See application file for complete search history.

(56) References Cited

U.S. PATENT DOCUMENTS

| | | | |
|---|---|---|---|
| 9,185,375 B2 | 11/2015 | Tanaka et al. | |
| 2006/0038891 A1* | 2/2006 | Okutomi | H04N 23/843 |
| | | | 348/222.1 |

(Continued)

FOREIGN PATENT DOCUMENTS

| | | | | |
|---|---|---|---|---|
| CN | 105163098 A | * | 12/2015 | |
| CN | 113870106 A | * | 12/2021 | G06T 3/4023 |

(Continued)

OTHER PUBLICATIONS

Menon, D., et al., "Demosaicing with directional filtering and a posteriori decision", IEEE Transactions on Image Processing, vol. 16, No. 1, Jan. 2007, pp. 132-141, http://www.dei.unipd.it/ddfapd.

*Primary Examiner* — Henok Shiferaw
*Assistant Examiner* — Woo C Rhim
(74) *Attorney, Agent, or Firm* — Sughrue Mion, PLLC

(57) ABSTRACT

An image processing method for demosaicing with reduced moire includes selecting, with respect to a target channel among a plurality of color channels for an input image, a target pixel unassigned with a color value for the target channel, calculating, with respect to the target pixel, gradient values respectively corresponding to a first direction and a second direction associated with the target channel, calculating, with respect to the target pixel, moire values respectively corresponding to the first direction and the second direction, and determining an interpolation direction of the target pixel for the target channel to be one of the first direction and the second direction, based on the calculated gradient values and the calculated moire values.

18 Claims, 9 Drawing Sheets
(2 of 9 Drawing Sheet(s) Filed in Color)

(56) References Cited

U.S. PATENT DOCUMENTS

| | | | | |
|---|---|---|---|---|
| 2007/0002154 A1* | 1/2007 | Kang | H04N 25/134 | |
| | | | 348/222.1 | |
| 2008/0075393 A1* | 3/2008 | Kwon | H04N 23/843 | |
| | | | 382/300 | |
| 2008/0247662 A1* | 10/2008 | Yasuma | H04N 23/843 | |
| | | | 382/300 | |
| 2009/0295934 A1* | 12/2009 | Au | G06T 3/4015 | |
| | | | 348/E3.012 | |
| 2010/0104214 A1* | 4/2010 | Tamburrino | H04N 23/843 | |
| | | | 382/300 | |
| 2012/0293696 A1* | 11/2012 | Tanaka | H04N 23/843 | |
| | | | 348/E9.002 | |
| 2013/0051665 A1* | 2/2013 | Shinozaki | G06T 5/77 | |
| | | | 382/167 | |
| 2016/0284053 A1* | 9/2016 | Nishimura | G06T 11/001 | |
| 2017/0039682 A1* | 2/2017 | Oh | G06T 7/90 | |
| 2017/0053379 A1* | 2/2017 | Wang | G06T 3/4015 | |
| 2017/0178292 A1* | 6/2017 | Jiang | H04N 23/843 | |
| 2019/0318452 A1* | 10/2019 | Oh | G06T 5/70 | |
| 2019/0387205 A1* | 12/2019 | Chuang | H04N 23/10 | |
| 2020/0059634 A1* | 2/2020 | Chou | H04N 9/646 | |
| 2020/0184598 A1* | 6/2020 | Jiang | G06T 3/4015 | |
| 2022/0182590 A1* | 6/2022 | Cho | G06T 3/4015 | |
| 2023/0186427 A1* | 6/2023 | Yu | G06T 11/001 | |
| | | | 382/167 | |
| 2023/0230199 A1* | 7/2023 | Swami | G06T 5/20 | |
| | | | 382/167 | |
| 2023/0232122 A1* | 7/2023 | Swami | H04N 9/67 | |
| | | | 348/222.1 | |
| 2024/0185382 A1* | 6/2024 | Kang | G06T 7/0002 | |

FOREIGN PATENT DOCUMENTS

| | | | | | |
|---|---|---|---|---|---|
| CN | 115147278 A | * | 10/2022 | | G06T 3/4007 |
| JP | 2009-171196 A | | 7/2009 | | |
| KR | 100866187 B1 | * | 10/2008 | | H04N 9/646 |
| KR | 10-1730968 B1 | | 4/2017 | | |
| KR | 10-2415061 B1 | | 6/2022 | | |

* cited by examiner

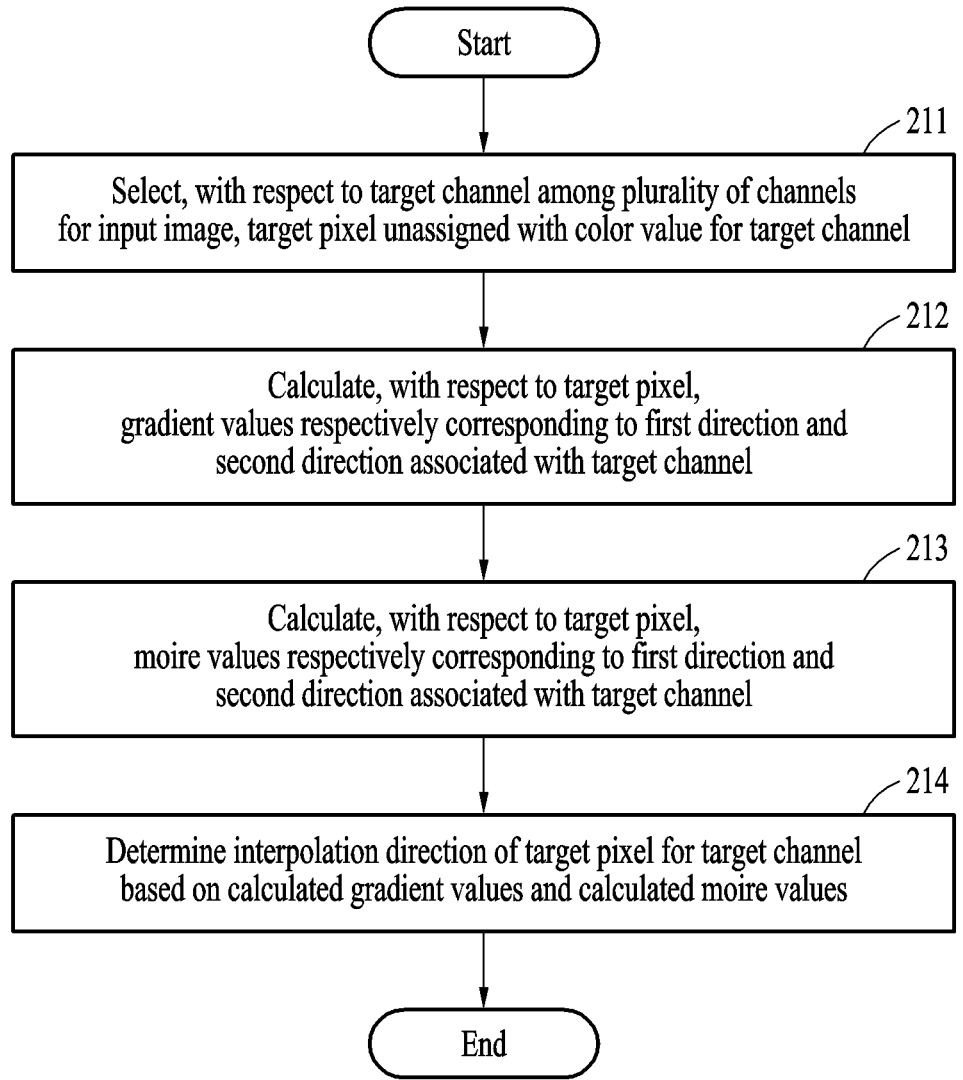

Start

211

Select, with respect to target channel among plurality of channels
for input image, target pixel unassigned with color value for target channel

212

Calculate, with respect to target pixel,
gradient values respectively corresponding to first direction and
second direction associated with target channel

213

Calculate, with respect to target pixel,
moire values respectively corresponding to first direction and
second direction associated with target channel

214

Determine interpolation direction of target pixel for target channel
based on calculated gradient values and calculated moire values End

FIG. 2

From 213

214

611

Correct gradient values using moire values

612

Determine interpolation direction of target pixel for target channel based on comparison between corrected gradient values End

DEMOSAICING METHOD AND APPARATUS FOR MOIRE REDUCTION

CROSS-REFERENCE TO RELATED APPLICATION

This application claims priority from Korean Patent Application No. 10-2022-0165748, filed on Dec. 1, 2022, in the Korean Intellectual Property Office, the disclosure of which is incorporated herein by reference in its entirety.

BACKGROUND

1. Field

Methods and apparatuses consistent with embodiments relate to a demosaicing technique for moire reduction.

2. Description of the Related Art

Demosaicing technologies have been developed to improve the quality of reconstructing color images, and a directional interpolation method, one of the demosaicing technologies, has been widely adopted because of its low complexity and excellent performance. The directional interpolation method may be a method of calculating gradients in each pixel for directions and interpolating pixel values in a direction having a smaller gradient. Using the directional interpolation method may reduce the occurrence frequency of sawtooth patterns at the boundary of an image but still has a problem in that false colors may occur in a high frequency domain. False colors in a high frequency domain may occur mainly due to moire. Moire occurs when two or more regular patterns overlap, and may refer to a pattern generated by the interference of two or more regular patterns. Moire may occur due to the interference of a regular pattern of a subject and a regular pattern of a color filter array. The occurrence of moire may cause false colors during demosaicing.

SUMMARY

One or more embodiments may address at least the above problems and/or disadvantages and other disadvantages not described above. Also, the embodiments are not required to overcome the disadvantages described above, and an embodiment may not overcome any of the problems described above.

According to an aspect of an embodiment, there is provided an image processing method for demosaicing with reduced moire, the image processing method including selecting, with respect to a target channel among a plurality of color channels for an input image, a target pixel unassigned with a color value for the target channel, calculating, with respect to the target pixel, gradient values respectively corresponding to a first direction and a second direction associated with the target channel, calculating, with respect to the target pixel, moire values respectively corresponding to the first direction and the second direction, and determining an interpolation direction of the target pixel for the target channel to be one of the first direction and the second direction, based on the calculated gradient values and the calculated moire values.

The calculating of the gradient values may include calculating a first gradient value corresponding to the first direction based on at least one difference value between pixels of a same channel among a plurality of pixels arranged in the first direction based on the target pixel, and calculating a second gradient value corresponding to the second direction based on at least one difference value between pixels of a same channel among a plurality of pixels arranged in the second direction based on the target pixel.

The calculating of the moire values may include calculating a first moire value corresponding to the first direction based on at least one difference value between adjacent pixels among the plurality of pixels arranged in the first direction based on the target pixel, and calculating a second moire value corresponding to the second direction based on at least one difference value between adjacent pixels among the plurality of pixels arranged in the second direction based on the target pixel.

The determining of the interpolation direction of the target pixel for the target channel may include correcting the calculated gradient values using the calculated moire values, and determining the interpolation direction of the target pixel for the target channel based on a comparison between the corrected gradient values.

The correcting of the calculated gradient values may include correcting the first gradient value to a value obtained by adding the first gradient value corresponding to the first direction and the second moire value corresponding to the second direction, and correcting the second gradient value to a value obtained by adding the second gradient value corresponding to the second direction and the first moire value corresponding to the first direction.

The determining of the interpolation direction of the target pixel for the target channel based on the comparison between the corrected gradient values may include determining the interpolation direction to be the first direction based on the corrected first gradient value being less than or equal to the corrected second gradient value, and determining the interpolation direction to be the second direction based on the corrected first gradient value exceeding the corrected second gradient value.

The input image may be a Bayer pattern image.

Based on the target channel being a green channel, the first direction may be a horizontal direction and the second direction may be a vertical direction.

The determining of the interpolation direction of the target pixel for the target channel may include setting, between the first direction and the second direction, a direction corresponding to a smaller gradient value as a first candidate direction and a direction corresponding to a greater gradient value as a second candidate direction by comparing the calculated gradient values, determining the first candidate direction to be the interpolation direction based on both the calculated first moire value and the calculated second moire value exceeding a threshold, and determining the second candidate direction to be the interpolation direction based on at least one of the calculated first moire value or the calculated second moire value being less than or equal to the threshold.

The image processing method may further include obtaining a color image by demosaicing the input image, generating a corrected first gradient map representing information about interpolation directions of respective pixels in the input image for the target channel, generating a corrected second gradient map by increasing a resolution of the generated corrected first gradient map to a target resolution through linear interpolation, and upscaling the obtained color image to the target resolution using the generated corrected second gradient map.

According to an aspect of an embodiment, there is provided an image processing apparatus for demosaicing with reduced moire, the image processing apparatus including at least one memory configured to store program code; and a processor configured to operate as instructed by the program code and configured to: select, with respect to a target channel among a plurality of color channels for an input image, a target pixel unassigned with a color value for the target channel, calculate, with respect to the target pixel, gradient values respectively corresponding to a first direction and a second direction associated with the target channel, calculate, with respect to the target pixel, moire values respectively corresponding to the first direction and the second direction, and determine an interpolation direction of the target pixel for the target channel to be one of the first direction and the second direction, based on the calculated gradient values and the calculated moire values.

The processor may be further configured to calculate a first gradient value corresponding to the first direction based on at least one difference value between pixels of a same channel among a plurality of pixels arranged in the first direction based on the target pixel, and calculate a second gradient value corresponding to the second direction based on at least one difference value between pixels of a same channel among a plurality of pixels arranged in the second direction based on the target pixel.

The processor may be further configured to calculate a first moire value corresponding to the first direction based on at least one difference value between adjacent pixels among the plurality of pixels arranged in the first direction based on the target pixel, and calculate a second moire value corresponding to the second direction based on at least one difference value between adjacent pixels among the plurality of pixels arranged in the second direction based on the target pixel.

The processor may be further configured to correct the calculated gradient values using the calculated moire values, and determine the interpolation direction of the target pixel for the target channel based on a comparison between the corrected gradient values.

The processor may be further configured to correct the first gradient value to a value obtained by adding the first gradient value corresponding to the first direction and the second moire value corresponding to the second direction, and correct the second gradient value to a value obtained by adding the second gradient value corresponding to the second direction and the first moire value corresponding to the first direction.

The processor may be further configured to determine the interpolation direction to be the first direction based on the corrected first gradient value being less than or equal to the corrected second gradient value, and determine the interpolation direction to be the second direction based on the corrected first gradient value exceeding the corrected second gradient value.

The input image may be a Bayer pattern image.

Based on the target channel being a green channel, the first direction may be a horizontal direction and the second direction may be a vertical direction.

The processor may be further configured to set, between the first direction and the second direction, a direction corresponding to a smaller gradient value as a first candidate direction and a direction corresponding to a greater gradient value as a second candidate direction by comparing the calculated gradient values, determine the first candidate direction to be the interpolation direction based on both the calculated first moire value and the calculated second moire value exceeding a threshold, and determine the second candidate direction to be the interpolation direction based on at least one of the calculated first moire value or the calculated second moire value being less than or equal to the threshold.

The processor may be further configured to obtain a color image by demosaicing the input image, generate a corrected first gradient map representing information about interpolation directions of respective pixels in the input image for the target channel, generate a corrected second gradient map by increasing a resolution of the generated corrected first gradient map to a target resolution through linear interpolation, and upscale the obtained color image to the target resolution using the generated corrected second gradient map.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and/or other aspects will be more apparent by describing certain embodiments with reference to the accompanying drawings, in which:

FIG. 2 is a flowchart schematically illustrating an operation of demosaicing an input image by an image processing apparatus according to an embodiment;

DETAILED DESCRIPTION

Figure 1:
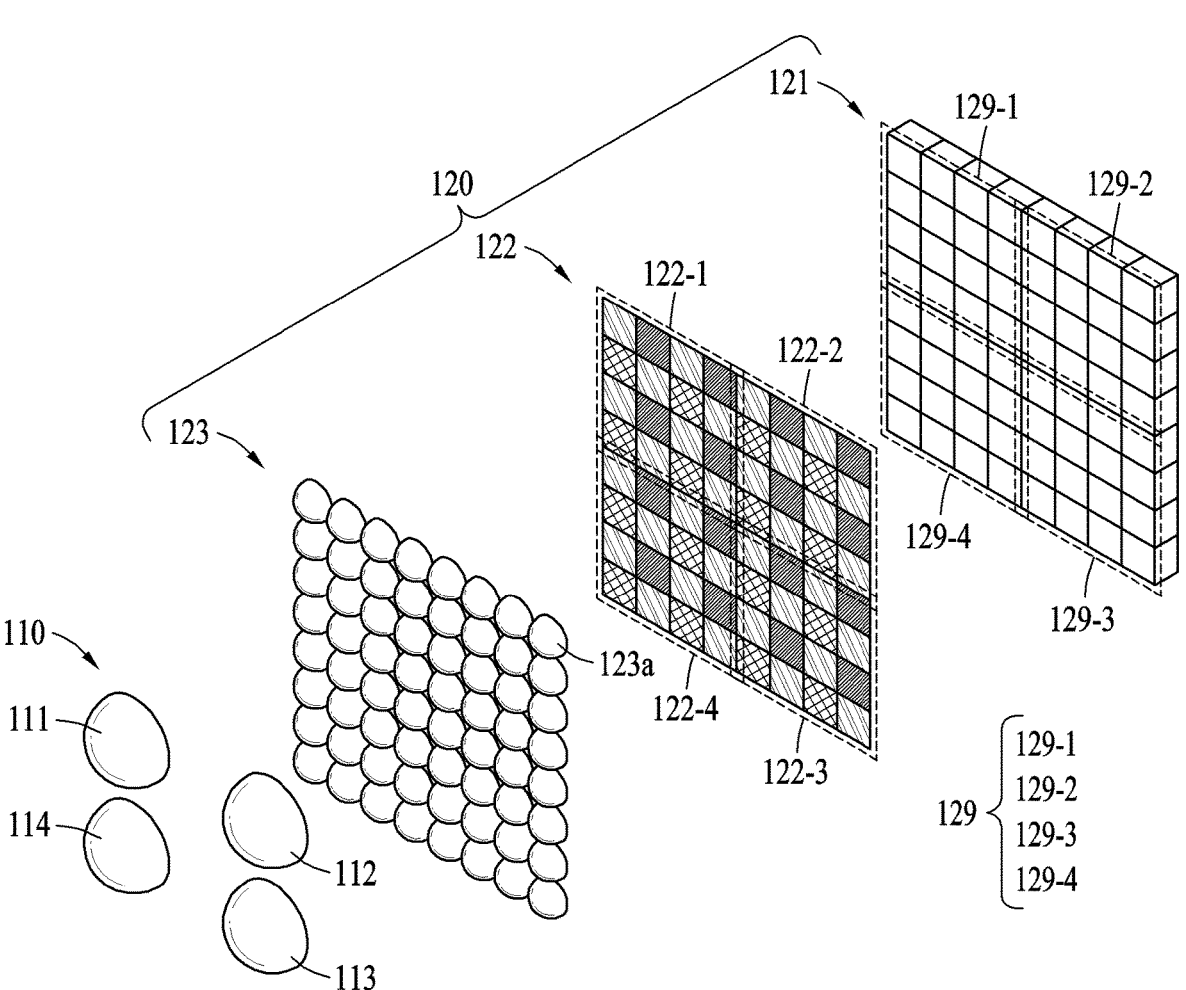
FIG. 1 illustrates a structure of an image processing apparatus according to an embodiment.

The following detailed structural or functional description is provided as an example only and various alterations and modifications may be made to the examples. Here, the embodiments are not construed as limited to the disclosure and should be understood to include all changes, equivalents, and replacements within the idea and the technical scope of the disclosure.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly, the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or populations thereof.

Unless otherwise defined, all terms, including technical and scientific terms, used herein have the same meaning as commonly understood by those having ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, embodiments will be described in detail with reference to the accompanying drawings. When describing the embodiments with reference to the accompanying drawings, like reference numerals refer to like elements and a repeated description related thereto will be omitted.

FIG. 1 illustrates a structure of an image processing apparatus according to an embodiment.

Referring to FIG. 1, an image processing apparatus for demosaicing with reduced moire may include a lens array 110 and an image sensor 120.

The lens array 110 may include one or more imaging lenses. In FIG. 1, an example of the lens array 110 including a first imaging lens 111, a second imaging lens 112, a third imaging lens 113, and a fourth imaging lens 114 is shown.

The image sensor 120 may include a sensing array 121, an optical filter 122, and a condensing lens array 123. However, embodiments are not limited thereto, and in an embodiment, an optical filter may be implemented integrally with the condensing lens array 123 including an individual condensing microlens 123a that has an optical characteristic of passing a predetermined wavelength band and blocking the remaining wavelength bands.

The first to the fourth imaging lenses 111, 112, 113, and 114 of the lens array 110 may cover sensing regions 129 of the sensing array 121 corresponding to its lens size. The sensing regions 129 may be regions on the sensing array 121 where rays of a predetermined field of view (FOV) range reach after passing through a corresponding imaging lens. The sensing regions 129 may be regions on the sensing array 121 where rays of a predetermined field of view (FOV) range reach after passing through a corresponding imaging lens. For example, the sensing regions 129 may include a first sensing region 129-1 corresponding to the first imaging lens 111, a second sensing region 129-2 corresponding to the second imaging lens 112, a third sensing region 129-3 corresponding to the third imaging lens 113, and a fourth sensing region 129-4 corresponding to the fourth imaging lens 114.

The optical filter 122 may be a filter having an optical characteristic of passing a predetermined wavelength band and blocking the remaining wavelength bands. The optical filter 122 may include one or more color filters. Each color filter may transmit light corresponding to a wavelength of a single color (e.g., one of red, blue, and green) among received light. For example, the optical filter 122 may be implemented as a color filter array (CFA) including a plurality of color filters 122-1, 122-2, 122-3, and 122-4 arranged along a filter plane. A pattern including one red pass filtering element, one blue pass filtering element, and two green pass filtering elements may be repeatedly arranged on a color filter. The pattern described above may be a Bayer pattern.

The sensing array 121 may include optical sensing elements. An optical sensing element may be an element that senses optical information based on light incident onto the element, and may output a value indicating an intensity of the incident light. The optical sensing element may include, for example, a complementary metal-oxide-semiconductor (CMOS), a charge-coupled device (CCD), and a photodiode. Herein, a pixel refers to basic unit information constituting an image, and a sensing element refers to a hardware element that outputs a pixel value of a corresponding pixel in response to light being received from a subject.

According to an embodiment, the image processing apparatus may obtain a Bayer pattern image through sensing elements included in a sensing region (e.g., the sensing region 129-1) of a sensing array corresponding to a Bayer pattern color filter (e.g., the color filter 122-1). The image processing apparatus may obtain a low-resolution color image by demosaicing the obtained Bayer pattern image. Furthermore, the image processing apparatus may obtain a plurality of low-resolution color images by demosaicing each of Bayer pattern input images obtained respectively from the sensing regions (e.g., the sensing regions 129-1 to 129-4). The process of obtaining one color image by demosaicing one Bayer pattern input image obtained by sensing elements of one sensing region (e.g., the sensing region 129-1) will be described in more detail with reference to FIGS. 2 to 7.

According to an embodiment, the image processing apparatus may reconstruct a high-resolution output image using the obtained plurality of low-resolution color images. More specifically, the image processing apparatus may upscale each of the plurality of low-resolution color images to a target resolution, and merge the plurality of upscaled color images to reconstruct one output image. The process of upscaling one color image to a target resolution will be described in more detail with reference to FIG. 8. For reference, the operation described below as being performed by the image processing apparatus may be performed by a processor of the image processing apparatus.

FIG. 2 is a flowchart schematically illustrating an operation of demosaicing an input image by an image processing apparatus according to an embodiment.

Each of a plurality of pixels included in an input image may have only a color value for one color channel among a plurality of color channels (e.g., a green channel, a red channel, and a blue channel) with respect to a corresponding pixel position. For example, in the input image, a pixel of a green channel may have only a green value, a pixel of a red channel may have only a red value, and a pixel of a blue channel may have only a blue value. Herein, a pixel of a red channel may be a pixel corresponding to a sensing element that senses a color value (the red value) for the red channel via a red filtering element of a color filter, a pixel of a blue channel may be a pixel corresponding to a sensing element that senses a color value (the blue value) for the blue channel via a blue filtering element of the color filter, and a pixel of a green channel may be a pixel corresponding to a sensing element that senses a color value (the green value) for the green channel via a green filtering element of the color filter.

An image processing apparatus according to an embodiment may obtain an input image by using sensing elements that receive light passing through a Bayer pattern color filter. The input image may be a Bayer pattern image. The image processing apparatus may demosaic the input image to obtain a color image having color values of all color channels (e.g., the green channel, the red channel, and the blue channel) for each of the pixels included in the input image. Hereinafter, the operation of demosaicing the input image by the image processing apparatus according to an embodiment will be described.

First, in operation 211, the image processing apparatus may select, with respect to a target channel among a plurality of channels (e.g., a green channel, a red channel, and a blue channel) for an input image, a target pixel that is unassigned with a color value for the target channel.

In operation 212, the image processing apparatus may calculate, with respect to the target pixel, gradient values respectively corresponding to a first direction and a second direction associated with the target channel. A gradient value may be a variation of a color value between pixels of the same color channel among pixels arranged around a current pixel.

Figure 3:
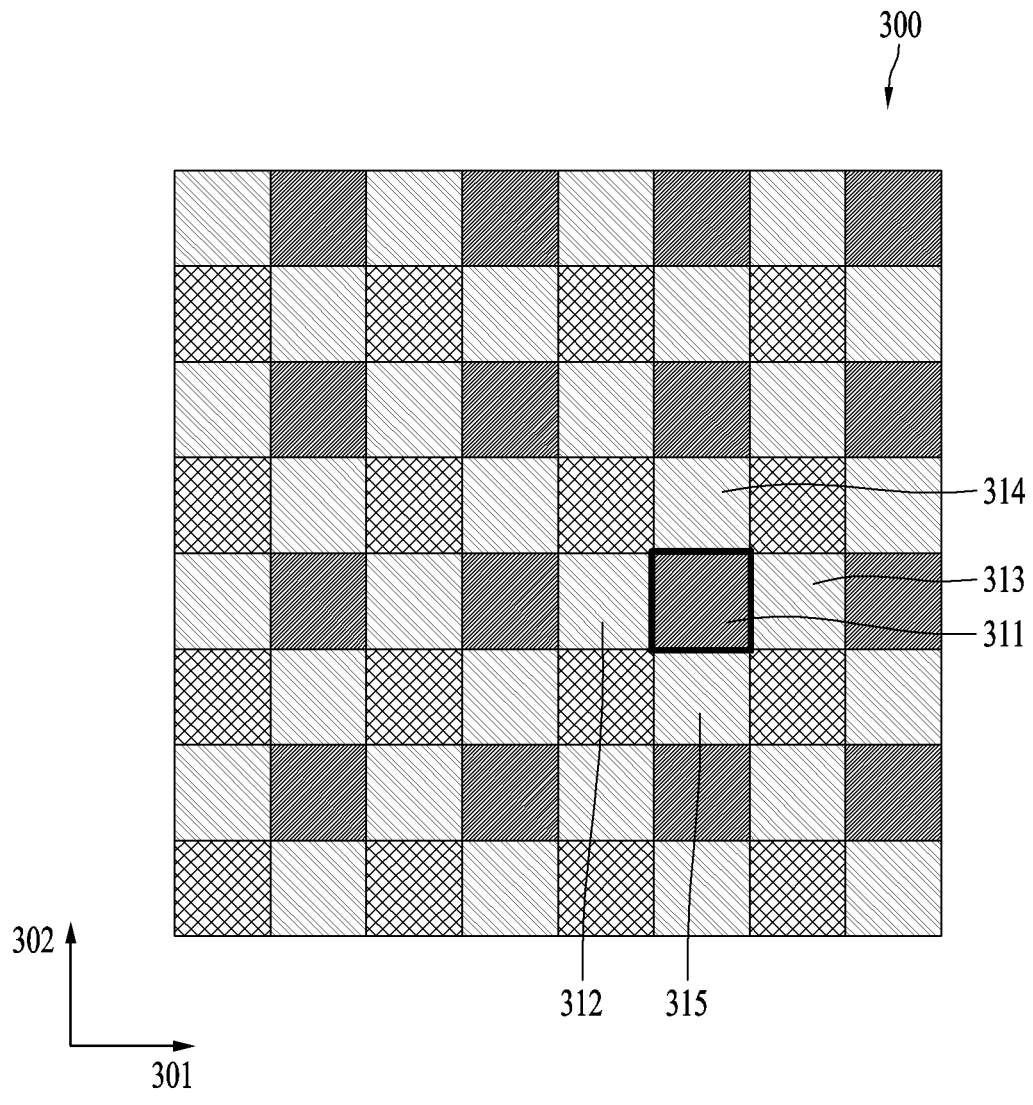
FIG. 3 is a diagram illustrating a first direction and a second direction associated with a target channel according to an embodiment.

FIG. 3 is a diagram illustrating a first direction and a second direction associated with a target channel. Referring to FIG. 3, for example, when a target channel is a green channel, pixels (e.g., pixels 312, 313, 314, and 315) of the green channel may be arranged respectively on the left, right, top, and bottom of a target pixel 311 unassigned with a color value for the green channel in a Bayer pattern input image 300. An image processing apparatus may predict a color value of the target pixel 311 for the green channel using pixels of the green channel (e.g., the pixels 312 and 313) arranged in a horizontal direction 301 based on the target pixel 311, or predict the color value of the target pixel 311 for the green channel using pixels of the green channel (e.g., the pixels 314 and 315) arranged in a vertical direction 302 based on the target pixel 311. The direction associated with the target channel may be the direction in which pixels used to predict the color value of the target pixel for the target channel are arranged based on the target pixel. For example, when the target channel is a green channel, a first direction associated with the target channel may be the horizontal direction 301, and a second direction may be the vertical direction 302, but embodiments are not necessarily limited thereto.

Referring back to FIG. 2, in operation 213, the image processing apparatus may calculate, with respect to the target pixel, moire values respectively corresponding to the first direction and the second direction associated with the target channel. A moire value may be a variation of a color value between pixels of different color channels among pixels arranged around a current pixel.

In operation 214, the image processing apparatus may determine, with respect to the target pixel, an interpolation direction of the target pixel for the target channel based on the calculated gradient values and the calculated moire values. The image processing apparatus may determine the interpolation direction of the target pixel for the target channel to be one of the first direction and the second direction.

According to an embodiment, when the interpolation direction of the target pixel for the target channel is determined, the image processing apparatus may predict a color value of the target pixel for the target channel based on the determined interpolation direction. The image processing apparatus may predict the color value of the target pixel for the target channel using color values of one or more pixels for the target channel, the one or more pixels having color values for the target channel among pixels arranged in the determined interpolation direction based on the target pixel.

Figure 4:
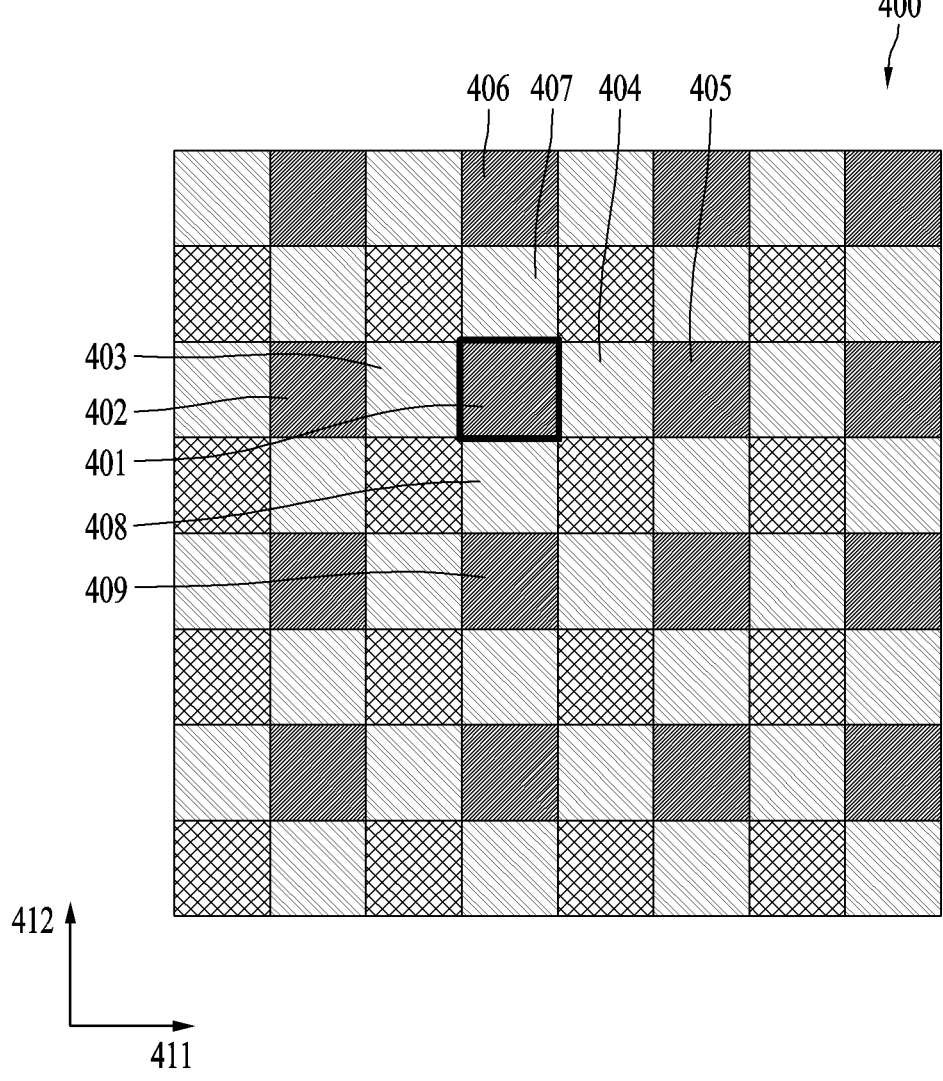
FIG. 4 is a diagram illustrating a process of calculating gradient values and moire values by an image processing apparatus according to an embodiment.

FIG. 4 is a diagram illustrating a process of calculating gradient values and moire values by an image processing apparatus according to an embodiment.

An image processing apparatus according to an embodiment may calculate, for a target pixel 401 in an input image 400, gradient values respectively corresponding to a first direction and a second direction associated with a target channel. The image processing apparatus may calculate a first gradient value corresponding to the first direction based on a difference value between pixels of the same channel among a plurality of pixels arranged in the first direction based on the target pixel 401. The image processing apparatus may calculate a second gradient value corresponding to the second direction based on a difference value between pixels of the same channel among a plurality of pixels arranged in the second direction based on the target pixel 401.

Referring to FIG. 4, by using a green channel as an example of a target channel, the image processing apparatus may calculate, for the target pixel 401 unassigned with a color value for the green channel, gradient values respectively corresponding to a first direction and a second direction associated with the green channel. As described above, the first direction corresponding to the green channel may be a horizontal direction 411, and the second direction corresponding to the green channel may be a vertical direction 412.

The image processing apparatus may calculate a difference value between pixels of the same channel among a plurality of pixels (e.g., the target pixel 401 and pixels 402, 403, 404, and 405) arranged in the horizontal direction 411 based on the target pixel 401, and calculate a first gradient value corresponding to the horizontal direction 411, which is the first direction, based on the calculated difference value. More specifically, the image processing apparatus may iteratively perform an operation of selecting two pixels of the same channel from among a plurality of pixels arranged in the horizontal direction 411 based on the target pixel 401 and calculating a difference value between the two selected pixels. The image processing apparatus may calculate an average value of a plurality of difference values calculated by iteratively performing the corresponding operation as the first gradient value corresponding to the horizontal direction 411. Here, the difference value between the two pixels may indicate a difference between the color values of the pixels. For example, the image processing apparatus may calculate the first gradient value corresponding to the horizontal direction 411 as an average value $$\left( \text{e.g.,} \ \frac{X_1 + X_2 + X_3}{3} \right)$$

of a difference value $X_1$ between a red value of the pixel 402 of the red channel and a red value of the target pixel 401 of the red channel, a difference value $X_2$ between the red value of the target pixel 401 of the red channel and a red value of the pixel 405 of the red channel, and a difference value $X_3$ between a green value of the pixel 403 of the green channel and a green value of the pixel 404 of the green channel. In FIG. 4, an example of the image processing apparatus using five pixels arranged in the horizontal direction 411 based on the target pixel 401 to calculate the first gradient value corresponding to the horizontal direction 411 is illustrated, but embodiments are not limited thereto. The image processing apparatus may use more or fewer pixels than five pixels that are arranged in the first direction based on the target pixel 401.

Similarly, the image processing apparatus may calculate a difference value between pixels of the same channel among the plurality of pixels (e.g., the target pixel 401 and pixels 406, 407, 408, and 409) arranged in the vertical direction 412 based on the target pixel 401, and calculate a second gradient value corresponding to the vertical direction 412 based on the calculated difference value. More specifically, the image processing apparatus may iteratively perform an operation of selecting two pixels of the same channel from among a plurality of pixels arranged in the vertical direction 412 based on the target pixel 401 and calculating a difference value between the two selected pixels. The image processing apparatus may calculate an average value of a plurality of difference values calculated by iteratively performing the corresponding operation as the second gradient value corresponding to the vertical direction 412. For example, the image processing apparatus may calculate the second gradient value corresponding to the vertical direction 412 as an average value $$\left( e.g., \ \frac{X_4 + X_5 + X_6}{3} \right)$$

of a difference value $X_4$ between a red value of the pixel 406 of the red channel and the red value of the target pixel 401 of the red channel, a difference value $X_5$ between the red value of the target pixel 401 of the red channel and a red value of the pixel 409 of the red channel, and a difference value $X_6$ between a green value of the pixel 407 of the green channel and a green value of the pixel 408 of the green channel.

Figure 5:
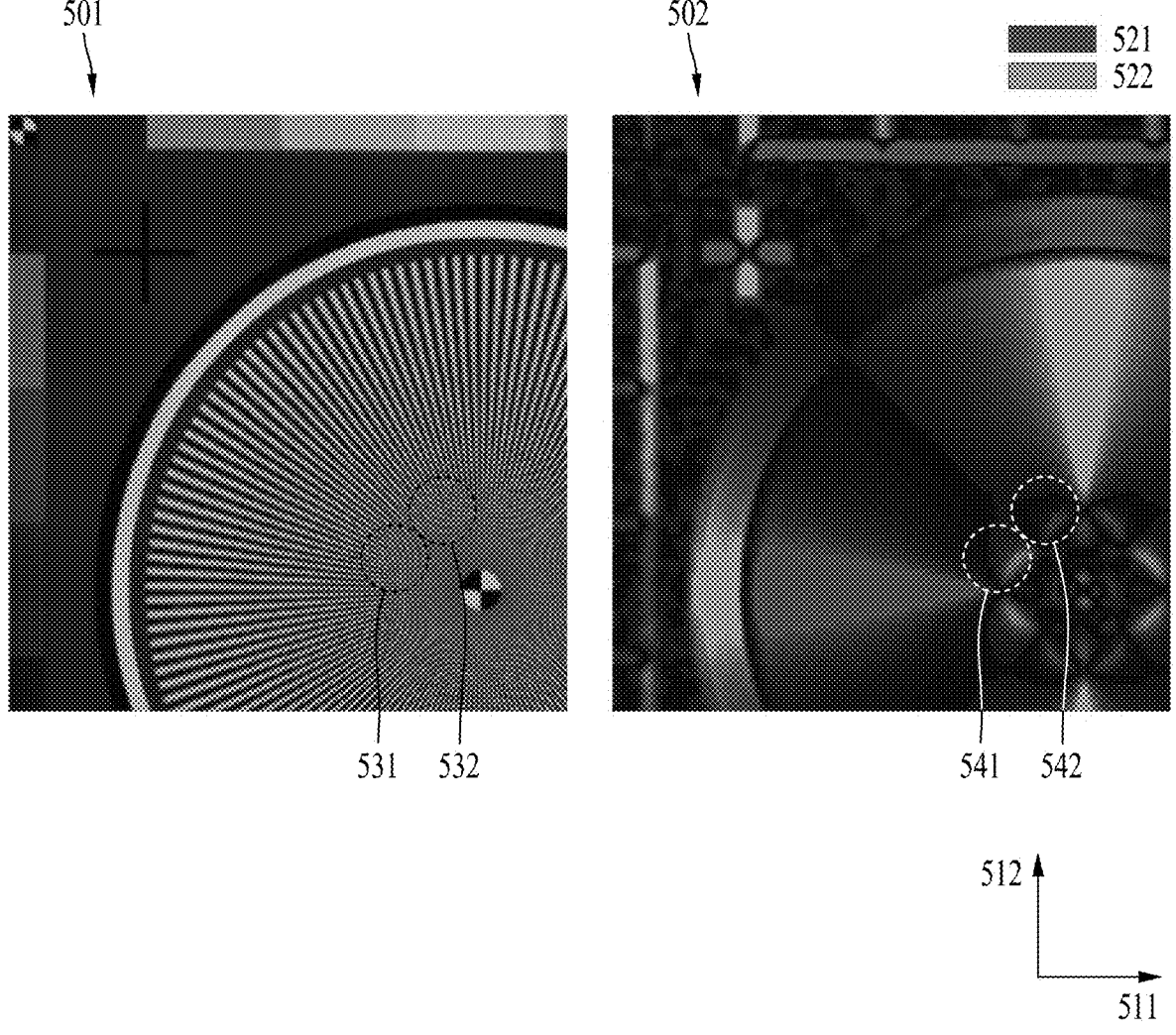
FIG. 5 is a diagram illustrating an example of a result of demosaicing an input image by an image processing apparatus according to a comparative embodiment.

FIG. 5 is a diagram illustrating a result of demosaicing an input image by an image processing apparatus according to a comparative embodiment. An image processing apparatus according to a comparative embodiment may select, with respect to one target channel among a plurality of color channels for an input image, a target pixel unassigned with a color value for the target channel, and calculate, with respect to the target pixel, gradient values respectively corresponding to a first direction and a second direction associated with the target channel. The image processing apparatus according to the comparative embodiment may determine an interpolation direction of the target pixel for the target channel to be a direction corresponding to a smaller gradient value by comparing a first gradient value corresponding to the first direction and a second gradient value corresponding to the second direction, and predict a color value of the target pixel for the target channel based on the determined interpolation direction. A color image 501 may be a color image obtained by the image processing apparatus according to the comparative embodiment that performs demosaicing on a Bayer pattern input image. A gradient map may be an image having the same resolution as the resolution of the input image, and may be an image representing, for respective pixels in the input image, information about a direction corresponding to a smaller gradient value, between the gradient value of the first direction and the gradient value of the second direction. A gradient map 502 shown in FIG. 5 may be a gradient map for a green channel. A pixel in the gradient map 502, corresponding to a pixel for which a direction corresponding to a smaller gradient value among gradient values for directions calculated for the green channel in the input image is a horizontal direction 511, may have a value of a first color 521, and a pixel in the gradient map 502, corresponding to a pixel for which the direction corresponding to a smaller gradient value among the gradient values for directions calculated for the green channel in the input image is a vertical direction 512, may have a value of a second color 522.

In other words, the image processing apparatus according to the comparative embodiment may perform demosaicing in consideration of only the gradient values, and in this case, sawtooth patterns may not occur at the boundary on the obtained color image 501. However, false colors may still occur in a high frequency domain. Referring to the color image 501 of FIG. 5, false colors may be detected in regions 531 and 532. These false colors may be caused by moire. Moire occurs when two or more regular patterns overlap, and may refer to a pattern generated by the interference of two or more regular patterns. The occurrence of moire may cause some difference between color values of a subject sensed by an image sensor and actual color values of the subject. In this case, when an interpolation direction of a target pixel included in an input image for a target channel is determined by comparing only gradient values calculated for each direction, the determined interpolation direction may be different from an actual interpolation direction of the target pixel for the target channel based on gradient values for each pixel calculated based on actual color values of the subject. False colors may be detected in the regions 531 and 532 of the color image 501. That is, due to the occurrence of moire, for each of the pixels in the input image corresponding to a region 541 of the gradient map 502 and the pixels in the input image corresponding to a region 542 of the gradient map 502, a determined interpolation direction of a corresponding pixel for a green channel may be different from the actual interpolation direction according to the actual color values of the subject. On the other hand, the image processing apparatus according to an embodiment may additionally consider moire values as well as the gradient values in order to determine the interpolation direction of the target pixel included in the input image for the target channel. Thus, the determined interpolation direction of the target pixel for the target channel may match the actual interpolation direction, which may reduce the occurrence of false colors caused by moire. Hereinafter, the process of calculating moire values by the image processing apparatus will be described.

The image processing apparatus according to an embodiment may calculate a first moire value corresponding to the first direction based on a difference value between adjacent pixels among a plurality of pixels arranged in the first direction based on the target pixel 401. The image processing apparatus may calculate a second moire value corresponding to the second direction based on a difference value between adjacent pixels among a plurality of pixels arranged in the second direction based on the target pixel 401.

Referring back to FIG. 4, the image processing apparatus may calculate, for the target pixel 401 unassigned with a color value for a green channel, moire values corresponding to the horizontal direction 411 and the vertical direction 412 associated with the green channel, respectively.

The image processing apparatus may calculate a difference value between adjacent pixels of different channels among the plurality of pixels (e.g., the target pixel 401 and the pixels 402, 403, 404, and 405) arranged in the horizontal direction 411 based on the target pixel 401, and calculate a first moire value corresponding to the horizontal direction 411, which is the first direction, based on the calculated difference value. More specifically, the image processing apparatus may iteratively perform an operation of selecting two pixels of different channels from among the plurality of pixels arranged in the horizontal direction 411 based on the target pixel 401 and calculating a difference value between the two selected pixels. The image processing apparatus may calculate an average value of a plurality of difference values calculated by iteratively performing the corresponding operation as the first moire value corresponding to the horizontal direction 411. For example, the image processing apparatus may calculate the first moire value corresponding to the horizontal direction 411 as an average value (e.g., $Y_1+Y_2+Y_3+Y_4/4$, of a difference value $Y_1$ between the red value of the pixel 402 of the red channel and the green value of the pixel 403 of the green channel, a difference value $Y_2$ between the green value of the pixel 403 of the green channel and the red value of the target pixel 401 of the red channel, a difference value $Y_3$ between the red value of the target pixel 401 of the red channel and the green value of the pixel 404 of the green channel, and a difference value $Y_4$ between the green value of the pixel 404 of the green channel and the red value of the pixel 405 of the red channel. In FIG. 5, an example of the image processing apparatus using five pixels arranged in the horizontal direction 411 based on the target pixel 401 to calculate the first moire value corresponding to the horizontal direction 411 is illustrated, but embodiments are not limited thereto. The image processing apparatus may use more or fewer pixels than five pixels that are arranged in the first direction based on the target pixel 401.

Similarly, the image processing apparatus may calculate a difference value between adjacent pixels of different channels among the plurality of pixels (e.g., the target pixel 401 and the pixels 406, 407, 408, and 409) arranged in the vertical direction 412 based on the target pixel 401, and calculate a second moire value corresponding to the vertical direction 412, which is the second direction, based on the calculated difference value. More specifically, the image processing apparatus may iteratively perform an operation of selecting two pixels of different channels from among the plurality of pixels arranged in the vertical direction 412 based on the target pixel 401 and calculating a difference value between the two selected pixels. The image processing apparatus may calculate an average value of a plurality of difference values calculated by iteratively performing the corresponding operation as the second moire value corresponding to the vertical direction 412. For example, the image processing apparatus may calculate the second moire value corresponding to the vertical direction 412 as an average value $$\left(\text{e.g., } \frac{Y_5 + Y_6 + Y_7 + Y_8}{4}\right)$$

of a difference value $Y_5$ between the red value of the pixel 406 of the red channel and the green value of the pixel 407 of the green channel, a difference value $Y_6$ between the green value of the pixel 407 of the green channel and the red value of the target pixel 401 of the red channel, a difference value $Y_7$ between the red value of the target pixel 401 of the red channel and the green value of the pixel 408 of the green channel, and a difference value $Y_8$ between the green value of the pixel 408 of the green channel and the red value of the pixel 409 of the red channel.

Figure 6:
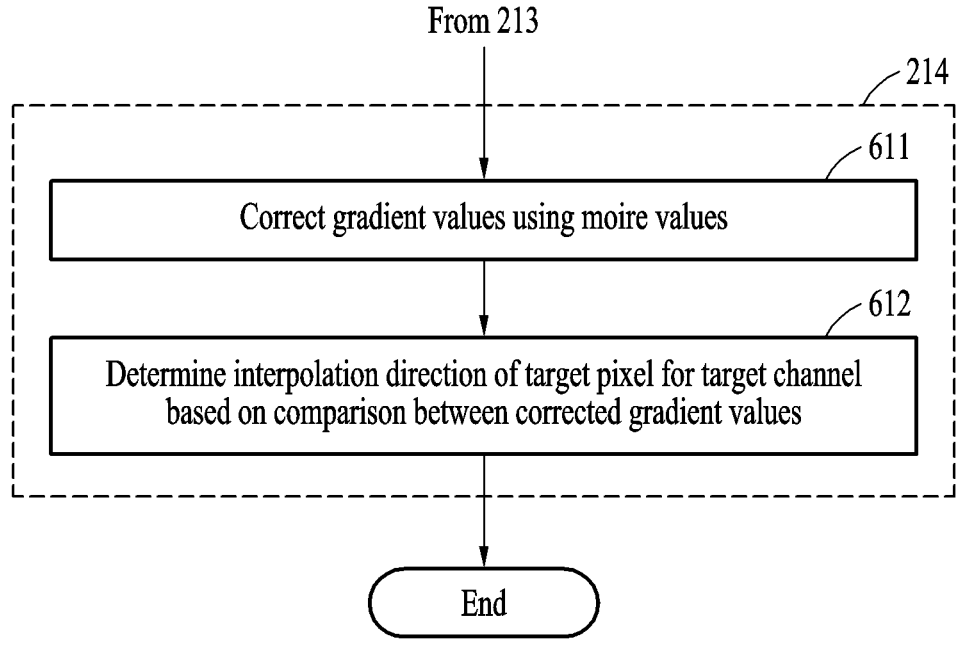
FIG. 6 is a flowchart illustrating a process of determining interpolation directions based on the correction of gradient values using moire values by an image processing apparatus according to an embodiment.

FIG. 6 is a flowchart illustrating a process of determining interpolation directions based on the correction of gradient values using moire values by an image processing apparatus according to an embodiment.

According to an embodiment, the image processing apparatus may calculate gradient values corresponding to a first direction and a second direction associated with a target channel, and calculate moire values corresponding to the first direction and the second direction. The image processing apparatus may determine an interpolation direction of a target pixel for the target channel to be one of the first direction and the second direction based on the calculated gradient values and the calculated moire values. FIG. 6 illustrates an embodiment of operation 214 of FIG. 2.

In operation 611, the image processing apparatus may correct gradient values using moire values.

According to an embodiment, the image processing apparatus may correct a first gradient value to a value obtained by adding the first gradient value corresponding to a first direction associated with a target channel and a second moire value corresponding to a second direction. The image processing apparatus may correct a second gradient value to a value obtained by adding the second gradient value corresponding to the second direction and the first moire value corresponding to the first direction.

According to another embodiment, the image processing apparatus may correct the first gradient value to a value obtained by adding the first gradient value corresponding to the first direction and a value, obtained by applying a first weight to the second moire value corresponding to the second direction. Similarly, the image processing apparatus may correct the second gradient value to a value obtained by adding the second gradient value corresponding to the second direction and a value, obtained by applying a second weight to the first moire value corresponding to the first direction. The first weight and the second weight may be the same or different.

In operation 612, the image processing apparatus may determine an interpolation direction of the target pixel for the target channel based on a comparison between the corrected gradient values. According to an embodiment, when the corrected first gradient value is less than or equal to the corrected second gradient value, the image processing apparatus may determine the interpolation direction of the target pixel for the target channel to be the first direction. Conversely, when the corrected first gradient value exceeds the corrected second gradient value, the image processing apparatus may determine the interpolation direction of the target pixel for the target channel to be the second direction.

According to an embodiment, the image processing apparatus may predict, with respect to a green channel as an example of the target channel, green values of target pixels unassigned with color values for the green channel based on the determined interpolation direction. In addition, the image processing apparatus may predict, with respect to one of a blue channel and a red channel (e.g., the red channel as an example of the target channel), red values of target pixels unassigned with color values for the red channel, and predict, with respect to the other channel (e.g., the blue channel as an example of the target channel), blue values of target pixels unassigned with color values for the blue channel. The image processing apparatus may use pixels arranged in the determined interpolation direction of the target pixel for the target channel based on the target pixel, to predict a color value of the target pixel for the target channel.

An example of predicting a green value of a target pixel unassigned with a color value for a green channel will be described. For example, referring to FIG. 4, the image processing apparatus may calculate a corrected first gradient value corresponding to the horizontal direction 411 of the target pixel 401 and a corrected second gradient value corresponding to the vertical direction 412 of the target pixel 401. The corrected first gradient value may be, for example, a value obtained by adding the first gradient value corresponding to the horizontal direction 411 calculated for the target pixel 401 and the second moire value corresponding to the vertical direction 412 calculated for the target pixel 401. Similarly, the corrected second gradient value may be, for example, a value obtained by adding the second gradient value corresponding to the vertical direction 412 calculated for the target pixel 401 and the first moire value corresponding to the horizontal direction 411 calculated for the target pixel 401. When the corrected first gradient value is less than or equal to the corrected second gradient value, the image processing apparatus may determine the interpolation direction of the target pixel 401 for the green channel to be the horizontal direction 411 corresponding to the corrected first gradient value. The image processing apparatus may predict the green value of the target pixel 401 as an average value of green values of one or more pixels among the pixels (e.g., the pixels 403 and 404) of the green channel arranged in the horizontal direction 411 based on the target pixel 401. Similarly, when the corrected first gradient value exceeds the corrected second gradient value, the image processing apparatus may determine the interpolation direction of the target pixel 401 for the green channel to be the vertical direction 412 corresponding to the corrected second gradient value. The image processing apparatus may predict the green value of the target pixel 401 as an average value of green values of one or more pixels among the pixels (e.g., the pixels 407 and 408) of the green channel arranged in the vertical direction 412 based on the target pixel 401.

Figure 7:
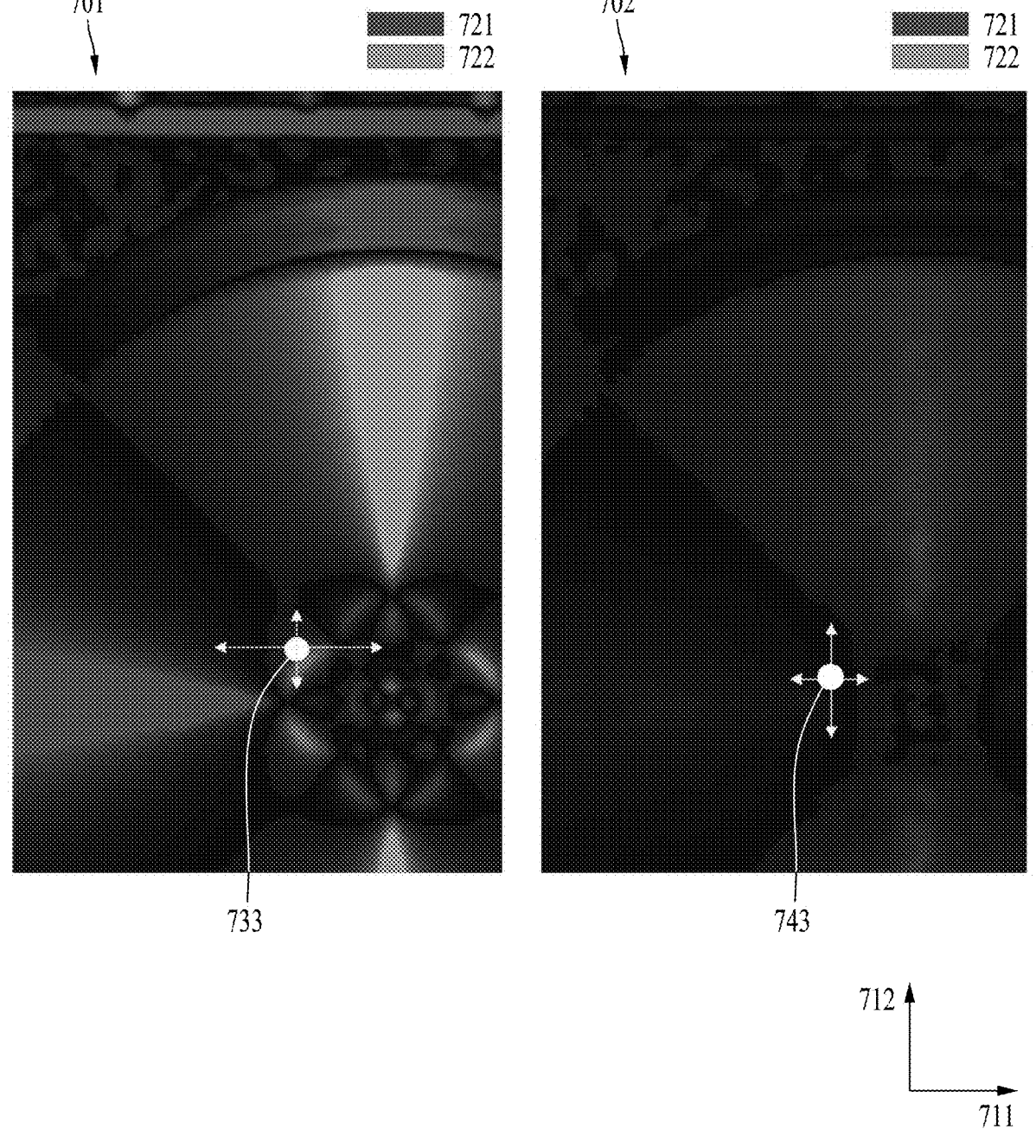
FIG. 7 illustrates an example of a gradient map for an input image and a corrected gradient map according to an embodiment.

FIG. 7 illustrates a gradient map for an input image and a corrected gradient map.

A gradient map 701 shown in FIG. 7 may be an image having the same resolution as the resolution of an input image, and may be an image representing, with respect to each pixel in the input image, information about a direction corresponding to a smaller gradient value, between a first gradient value of a horizontal direction 711 and a second gradient value of a vertical direction 712 for a green channel as an example of a target channel. A pixel in the gradient map 701, corresponding to a pixel for which a direction corresponding to a smaller gradient value among gradient values for directions calculated for the green channel in the input image is the horizontal direction 711, may have a value of a first color 721, and a pixel in the gradient map 701, corresponding to a pixel for which the direction corresponding to a smaller gradient value among the gradient values for directions calculated for the green channel in the input image is the vertical direction 712, may have a value of a second color 722.

For reference, the image processing apparatus may calculate gradient values for directions (e.g., the horizontal direction 711 and the vertical direction 712) associated with the green channel, even for a green pixel already assigned with a color value for the green channel in the input image. A method of calculating a gradient value for each direction with respect to a green pixel may be the same as a method of calculating a gradient value with respect to a blue pixel or a red pixel unassigned with a green value. The image processing apparatus may iteratively perform an operation of calculating a difference value between two pixels of the same channel among a plurality of pixels arranged in a horizontal direction based on a green pixel in an input image, and calculate an average value of a plurality of calculated difference values as a first gradient value corresponding to the horizontal direction. The image processing apparatus may iteratively perform an operation of calculating a difference value between two pixels of the same channel among a plurality of pixels arranged in a vertical direction based on a green pixel in the input image, and calculate an average value of a plurality of calculated difference values as a second gradient value corresponding to the vertical direction.

For example, at a pixel in the input image corresponding to a pixel 733 in the gradient map 701, the value of the first gradient corresponding to the horizontal direction 711 for the green channel may exceed the value of the second gradient corresponding to the vertical direction 712 for the green channel. In this case, the pixel 733 in the gradient map 701 may have a value of the second color 722.

A corrected gradient map 702 shown in FIG. 7 may be an image having the same resolution as the resolution of an input image, and may be an image representing, with respect to each pixel in the input image, information about a direction corresponding to a smaller gradient value, between a corrected first gradient value of the horizontal direction 711 and a corrected second gradient value of the vertical direction 712 for the green channel. In other words, the corrected gradient map 702 may be an image representing information about interpolation directions of respective pixels in the input image for the green channel. A pixel in the corrected gradient map 702, corresponding to a pixel for which a direction corresponding to a smaller gradient value among corrected gradient values for directions calculated for the green channel in the input image is the horizontal direction 711, may have a value of the first color 721 (e.g., a red value), and a pixel in the corrected gradient map 702, corresponding to a pixel for which the direction corresponding to a smaller gradient value among the corrected gradient values for directions calculated for the green channel in the input image is the vertical direction 712, may have a value of the second color 722 (e.g., a green value).

For reference, the image processing apparatus may calculate corrected gradient values for directions (e.g., the horizontal direction 711 and the vertical direction 712) associated with the green channel, even for a green pixel already assigned with a color value for the green channel in the input image. A method of calculating a corrected gradient value for each direction with respect to a green pixel may be the same as a method of calculating a corrected gradient value with respect to a blue pixel or a red pixel unassigned with a green value. The image processing apparatus may iteratively perform an operation of calculating a difference value between two adjacent pixels of different channels among a plurality of pixels arranged in a horizontal direction based on a green pixel in an input image, and calculate an average value of a plurality of calculated difference values as a first moire value corresponding to the horizontal direction. The image processing apparatus may iteratively perform an operation of calculating a difference value between two adjacent pixels of different channels among a plurality of pixels arranged in a vertical direction based on a green pixel in an input image, and calculate an average value of a plurality of calculated difference values as a second moire value corresponding to the vertical direction. The image processing apparatus may calculate, for a green pixel in the input image, a corrected first gradient value by adding a first gradient value of the green pixel and a second moire value, and calculate a corrected second gradient value by adding a second gradient value of the green pixel and a first moire value.

For example, at a pixel in the input image corresponding to a pixel 743 in the corrected gradient map 702, the value of the corrected first gradient corresponding to the horizontal direction 711 for the green channel may be less than or equal to the value of the corrected second gradient corresponding to the vertical direction 712 for the green channel. In this case, the pixel 743 in the corrected gradient map 702 may have a value of the first color 721.

Furthermore, the image processing apparatus according to an embodiment may determine an interpolation direction for each of target pixels unassigned with color values for a target channel in the input image based on the detection of a moire region in the input image. The image processing apparatus may determine, for each of the target pixels unassigned with color values for the target channel in the input image, the interpolation direction based on whether a corresponding target pixel belongs to the moire region. The image processing apparatus may determine whether a pixel belongs to the moire region based on a moire value corresponding to a first direction and a moire value corresponding to a second direction, the moire values being calculated based on the pixel.

More specifically, the image processing apparatus may calculate, for a target pixel unassigned with a color value for the target channel, a first moire value corresponding to a first direction, and calculate a second moire value corresponding to a second direction. The image processing apparatus may determine whether the target pixel belongs to the moire region based on the first moire value and the second moire value. When both the calculated first moire value and the calculated second moire value exceed a threshold, the image processing apparatus may determine the target pixel to be a pixel not belonging to the moire region. On the other hand, when at least one of the first moire value or the second moire value is less than or equal to the threshold, the image processing apparatus may determine the target pixel to be a pixel belonging to the moire region.

The image processing apparatus may compare gradient values corresponding to the first direction and the second direction calculated for the target channel of the target pixel with each other, and set a direction corresponding to a smaller gradient value, between the first gradient value and the second gradient value, as a first candidate direction and a direction corresponding to a greater gradient value as a second candidate direction. In response to the determination that the target pixel does not belong to the moire region, the image processing apparatus may determine the first candidate direction, which is the direction corresponding to the smaller gradient value between the first gradient value and the second gradient value, to be an interpolation direction of the target pixel for the target channel. Conversely, in response to the determination that the target pixel belongs to the moire region, the image processing apparatus may determine the second candidate direction, which is the direction corresponding to the greater gradient value between the first gradient value and the second gradient value, to be the interpolation direction of the target pixel for the target channel.

Figure 8:
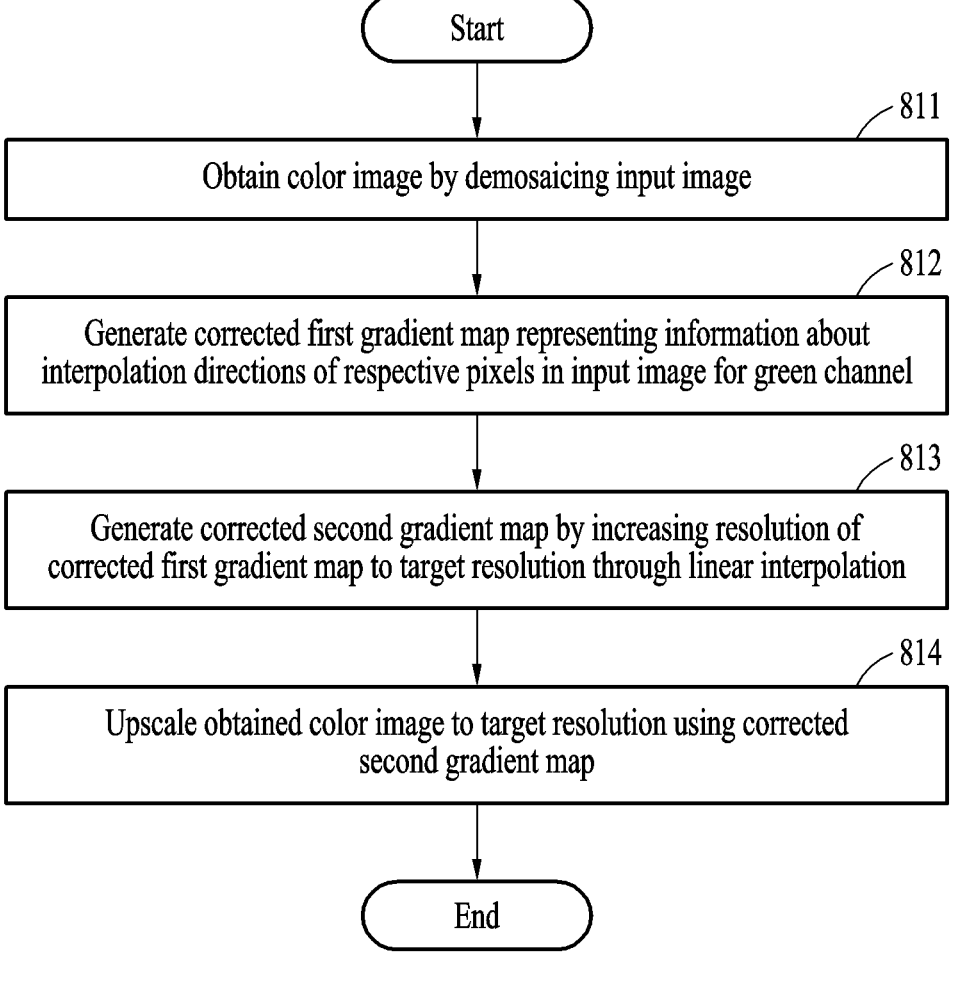
FIG. 8 is a flowchart illustrating a process of upscaling an input image by an image processing apparatus according to an embodiment.

FIG. 8 is a flowchart illustrating a process of upscaling an input image by an image processing apparatus according to an embodiment.

An image processing apparatus according to an embodiment may upscale a color image obtained by demosaicing an input image to a target resolution. For example, the target resolution may be a resolution twice the resolution of an existing color image, but embodiments are not limited thereto.

In operation 811, the image processing apparatus may obtain a color image by demosaicing an input image. Specifically, the image processing apparatus may convert the input image into the color image based on demosaicing the input image for each of a plurality of color channels.

In operation 812, the image processing apparatus may generate a corrected first gradient map (e.g., the corrected gradient map 702 of FIG. 7) representing information about interpolation directions of respective pixels in the input image for a green channel. The corrected first gradient map may be an image having the same resolution as the resolution of the input image.

For example, the image processing apparatus may assign a pixel value of "0" to a pixel in the corrected first gradient map, corresponding to a pixel for which a direction corresponding to a smaller gradient value among corrected gradient values for directions calculated for the green channel in the input image is a horizontal direction, and assign a pixel value of "1" to a pixel in the corrected first gradient map, corresponding to a pixel for which the direction corresponding to a smaller gradient value among the corrected gradient values for directions calculated for the green channel in the input image is a vertical direction.

In operation 813, the image processing apparatus may generate a corrected second gradient map by increasing a resolution of the corrected first gradient map to a target resolution through linear interpolation.

For example, the image processing apparatus may generate the corrected second gradient map by upscaling the corrected first gradient map including pixels each assigned with a pixel value of "0" or "1" to the target resolution through linear interpolation. The image processing apparatus may determine a pixel value of each pixel in the corrected second gradient map to be "0" or "1". The image processing apparatus may determine a pixel value of a pixel in the corrected second gradient map based on pixel values of pixels arranged around (e.g., on the top, bottom, left, and right of) the pixel. For example, the image processing apparatus may determine the pixel value of the pixel to be "1" when an average of the pixel values set for the pixels arranged around the pixel exceeds "0.5", and determine the pixel value of the pixel to be "0" when the average of the pixel values set for the pixels arranged around the pixel is less than or equal to "0.5".

In operation 814, the image processing apparatus may upscale the obtained color image to the target resolution using the corrected second gradient map.

Figure 9:
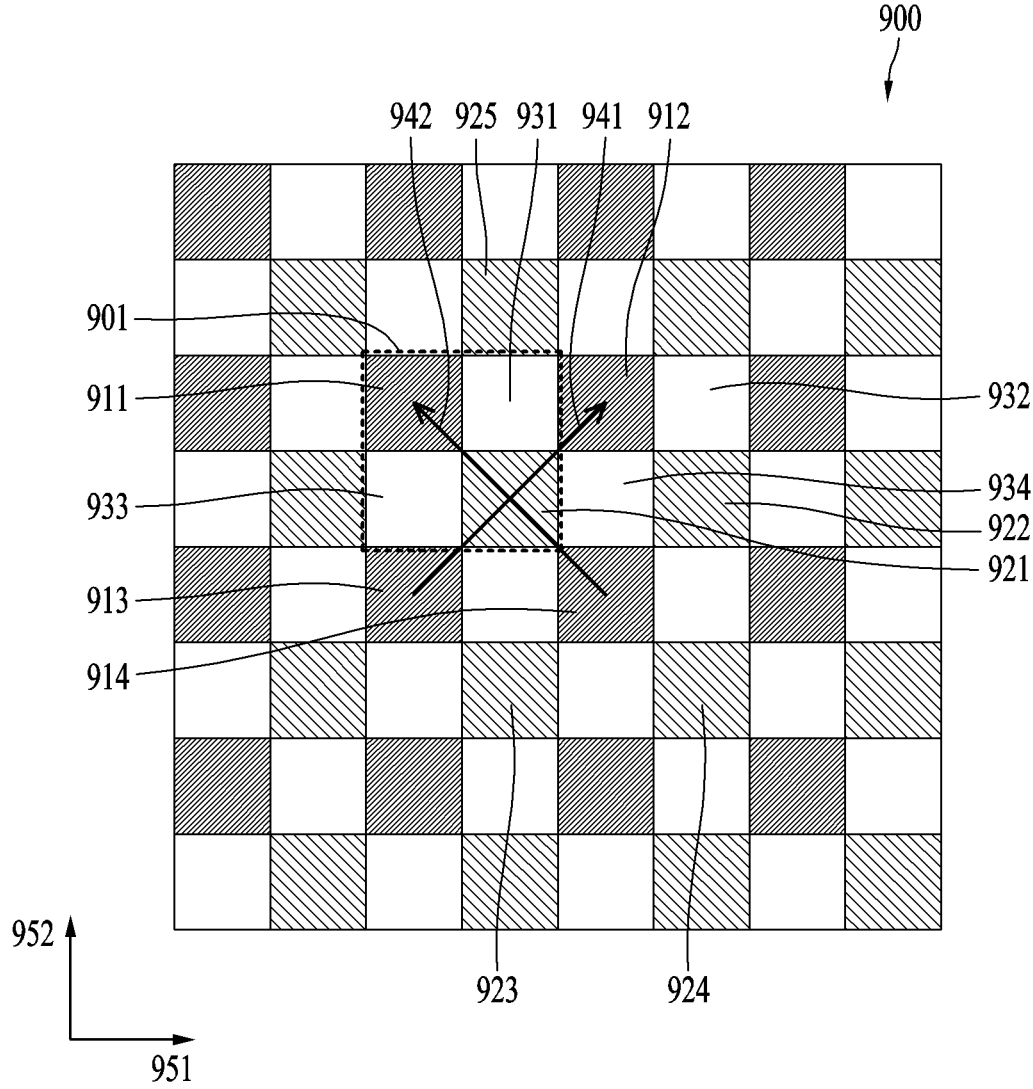
FIG. 9 illustrates an image obtained by upscaling a color image according to an embodiment.

Hereinafter, an example of the image processing apparatus upscaling the resolution of the color image twice will be described. FIG. 9 illustrates an image 900 (hereinafter, an upscaled image) obtained by upscaling a color image.

An image processing apparatus may make pixels in a color image obtained by demosaicing an input image correspond to first type of pixels (e.g., pixels 911, 912, 913, and 914) in the upscaled image 900. A first type of pixel may be, for example, a pixel arranged at the upper left end in a 2×2 pixel array (e.g., a pixel array 901) in the upscaled image 900. In other words, the image processing apparatus may set color values of the first type of pixel in the upscaled image 900 for color channels (e.g., a green channel, a red channel, and a blue channel) to be identical to the color values of a corresponding pixel in the existing color image for the color channels.

The image processing apparatus may predict color values of second type of pixels (e.g., pixels 921, 922, 923, and 924) in the upscaled image 900 for the color channels using the first type of pixels. For example, the image processing apparatus may predict color values of the second type of pixel 921 in the upscaled image 900 using the first type of pixels 911, 912, 913, and 914 arranged around the pixel 921. A second type of pixel may be, for example, a pixel arranged at the lower right end in a 2×2 pixel array (e.g., the pixel array 901) in the upscaled image 900. To predict a color value of the second type of pixel 921 for the green channel, the image processing apparatus may calculate a gradient value of the pixel 921 corresponding to a first diagonal direction 941 for the green channel and a gradient value of the pixel 921 corresponding to a second diagonal direction 942 for the green channel. The second diagonal direction 942 may be a direction orthogonal to the first diagonal direction 941. For example, the image processing apparatus may calculate a difference in green value between the pixels 912 and 913 arranged in the first diagonal direction 941 based on the pixel 921 as the gradient value corresponding to the first diagonal direction 941, and calculate a difference in green value between the pixels 911 and 914 arranged in the second diagonal direction 942 based on the pixel 921 as the gradient value corresponding to the second diagonal direction 942. The image processing apparatus may determine an interpolation direction for the green channel to be a direction corresponding to a smaller gradient value, between the gradient value corresponding to the first diagonal direction 941 and the gradient value corresponding to the second diagonal direction 942. The image processing apparatus may predict the green value of the pixel 921 using the determined interpolation direction. In the same way, the image processing apparatus may predict the red value and the blue value of the pixel 921.

The image processing apparatus may predict color values of third type of pixels (e.g., pixels 931, 932, 933, and 934) in the upscaled image 900 for the color channels using a corrected second gradient map. Third type of pixels may be, for example, pixels arranged at the upper right end and the lower left end in a 2×2 pixel array (e.g., the pixel array 901) in the upscaled image 900. In other words, the third type of pixels may be the remaining pixels excluding the first type of pixel and the second type of pixel in the upscaled image 900. As described above, the image processing apparatus may generate the corrected second gradient map having the target resolution. Since the corrected second gradient map and the upscaled image 900 have the same resolution that is the target resolution, pixels corresponding to the third type of pixels in the upscaled image 900 may be present in the corrected second gradient map. The image processing apparatus may determine interpolation directions of the third type of pixels in the upscaled image 900 based on the pixels in the corrected second gradient map corresponding to the third type of pixels. For example, when the pixel value of a pixel in the corrected second gradient map corresponding to the third type of pixel 931 is "0", the image processing apparatus may determine an interpolation direction of the third type of pixel 931 to be a horizontal direction 951. In this case, the image processing apparatus may determine a color value of the third type of pixel 931 for each color channel based on color values of one or more pixels among pixels (e.g., the pixels 911 and 912) arranged in the horizontal direction 951 based on the third type of pixel 931 for each color channel. As another example, when the pixel value of the pixel in the corrected second gradient map corresponding to the third type of pixel 931 is "1", the image processing apparatus may determine the interpolation direction of the third type of pixel 931 to be a vertical direction 952. In this case, the image processing apparatus may determine a color value of the third type of pixel 931 for each color channel based on color values of one or more pixels among pixels (e.g., the pixels 921 and 925) arranged in the vertical direction 952 based on the third type of pixel 931 for each color channel.

The units described herein may be implemented using a hardware component, a software component and/or a combination thereof. A processing device may be implemented using one or more general-purpose or special-purpose computers, such as, for example, a processor, a controller and an arithmetic logic unit (ALU), a digital signal processor (DSP), a microcomputer, a field-programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

The above-described devices may be configured to act as one or more software modules in order to perform the operations of the above-described embodiments, or vice versa.

A number of example embodiments have been described above. Nevertheless, it should be understood that various modifications may be made to these embodiments. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims and their equivalents.

What is claimed is:

1. An image processing method for demosaicing with reduced moire, the image processing method comprising:

selecting, with respect to a target channel among a plurality of color channels for an input image, a target pixel unassigned with a color value for the target channel;

calculating, with respect to the target pixel, gradient values respectively corresponding to a first direction and a second direction associated with the target channel;

calculating, with respect to the target pixel, moire values respectively corresponding to the first direction and the second direction;

determining an interpolation direction of the target pixel for the target channel to be one of the first direction and the second direction, based on the calculated gradient values and the calculated moire values;

obtaining a color image by demosaicing the input image;

generating a corrected first gradient map representing information about interpolation directions of respective pixels in the input image for the target channel;

generating a corrected second gradient map by increasing a resolution of the generated corrected first gradient map to a target resolution through linear interpolation; and upscaling the obtained color image to the target resolution using the generated corrected second gradient map.

2. The image processing method of claim 1, wherein the calculating the gradient values comprises:

calculating a first gradient value corresponding to the first direction based on at least one difference value between pixels of a same channel among a plurality of pixels arranged in the first direction based on the target pixel; and calculating a second gradient value corresponding to the second direction based on at least one difference value between pixels of a same channel among a plurality of pixels arranged in the second direction based on the target pixel.

3. The image processing method of claim 2, wherein the calculating the moire values comprises:

calculating a first moire value corresponding to the first direction based on at least one difference value between adjacent pixels among the plurality of pixels arranged in the first direction based on the target pixel; and calculating a second moire value corresponding to the second direction based on at least one difference value between adjacent pixels among the plurality of pixels arranged in the second direction based on the target pixel.

4. The image processing method of claim 3, wherein the determining the interpolation direction comprises:

correcting the calculated gradient values using the calculated moire values; and determining the interpolation direction of the target pixel for the target channel based on a comparison between the corrected gradient values.

5. The image processing method of claim 4, wherein the correcting the calculated gradient values comprises:

correcting the first gradient value to a value obtained by adding the first gradient value corresponding to the first direction and the second moire value corresponding to the second direction; and correcting the second gradient value to a value obtained by adding the second gradient value corresponding to the second direction and the first moire value corresponding to the first direction.

6. The image processing method of claim 5, wherein the determining the interpolation direction of the target pixel for the target channel based on the comparison between the corrected gradient values comprises:

determining the interpolation direction to be the first direction based on the corrected first gradient value being less than or equal to the corrected second gradient value; and determining the interpolation direction to be the second direction based on the corrected first gradient value exceeding the corrected second gradient value.

7. The image processing method of claim 1, wherein the input image is a Bayer pattern image.

8. The image processing method of claim 1, wherein based on the target channel being a green channel, the first direction is a horizontal direction and the second direction is a vertical direction.

9. The image processing method of claim 3, wherein the determining the interpolation direction comprises:

setting, between the first direction and the second direction, a direction corresponding to a smaller gradient value as a first candidate direction and a direction corresponding to a greater gradient value as a second candidate direction by comparing the calculated gradient values;

determining the first candidate direction to be the interpolation direction based on both the calculated first moire value and the calculated second moire value exceeding a threshold; and determining the second candidate direction to be the interpolation direction based on at least one of the calculated first moire value or the calculated second moire value being less than or equal to the threshold.

10. An image processing apparatus for demosaicing with reduced moire, the image processing apparatus comprising:

at least one memory configured to store program code; and a processor configured to operate as instructed by the program code and configured to:

select, with respect to a target channel among a plurality of color channels for an input image, a target pixel unassigned with a color value for the target channel;

calculate, with respect to the target pixel, gradient values respectively corresponding to a first direction and a second direction associated with the target channel;

calculate, with respect to the target pixel, moire values
respectively corresponding to the first direction and the
second direction; and determine an interpolation direction of the target pixel for
the target channel to be one of the first direction and the
second direction, based on the calculated gradient val-
ues and the calculated moire values, wherein the processor is further configured to:

obtain a color image by demosaicing the input image, generate a corrected first gradient map representing infor-
mation about interpolation directions of respective pix-
els in the input image for the target channel, generate a corrected second gradient map by increasing a
resolution of the generated corrected first gradient map
to a target resolution through linear interpolation, and upscale the obtained color image to the target resolution
using the generated corrected second gradient map.

11. The image processing apparatus of claim 10, wherein
the processor is further configured to calculate a first gra-
dient value corresponding to the first direction based on at
least one difference value between pixels of a same channel
among a plurality of pixels arranged in the first direction
based on the target pixel, and calculate a second gradient
value corresponding to the second direction based on at least
one difference value between pixels of a same channel
among a plurality of pixels arranged in the second direction
based on the target pixel.

12. The image processing apparatus of claim 11, wherein
the processor is further configured to calculate a first moire
value corresponding to the first direction based on at least
one difference value between adjacent pixels among the
plurality of pixels arranged in the first direction based on the
target pixel, and calculate a second moire value correspond-
ing to the second direction based on at least one difference
value between adjacent pixels among the plurality of pixels
arranged in the second direction based on the target pixel.

13. The image processing apparatus of claim 12, wherein
the processor is further configured to correct the calculated
gradient values using the calculated moire values, and determine the interpolation direction of the target pixel for
the target channel based on a comparison between the
corrected gradient values.

14. The image processing apparatus of claim 13, wherein
the processor is further configured to correct the first gra-
dient value to a value obtained by adding the first gradient
value corresponding to the first direction and the second
moire value corresponding to the second direction, and
correct the second gradient value to a value obtained by
adding the second gradient value corresponding to the
second direction and the first moire value corresponding to
the first direction.

15. The image processing apparatus of claim 14, wherein
the processor is further configured to determine the inter-
polation direction to be the first direction based on the
corrected first gradient value being less than or equal to the
corrected second gradient value, and determine the interpo-
lation direction to be the second direction based on the
corrected first gradient value exceeding the corrected second
gradient value.

16. The image processing apparatus of claim 10, wherein
the input image is a Bayer pattern image.

17. The image processing apparatus of claim 10, wherein
based on the target channel being a green channel, the first
direction is a horizontal direction and the second direction is
a vertical direction.

18. The image processing apparatus of claim 12, wherein
the processor is further configured to set, between the first
direction and the second direction, a direction corresponding
to a smaller gradient value as a first candidate direction and
a direction corresponding to a greater gradient value as a
second candidate direction by comparing the calculated
gradient values, determine the first candidate direction to be
the interpolation direction based on both the calculated first
moire value and the calculated second moire value exceed-
ing a threshold, and determine the second candidate direc-
tion to be the interpolation direction based on at least one of
the calculated first moire value or the calculated second
moire value being less than or equal to the threshold.

* * * * *